US012640659B2

(12) United States Patent
Chiba

(10) Patent No.: US 12,640,659 B2
(45) Date of Patent: May 26, 2026

(54) SWITCHING POWER SUPPLY DEVICE

(71) Applicant: GS Yuasa International Ltd., Kyoto (JP)

(72) Inventor: Akiteru Chiba, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 178 days.

(21) Appl. No.: 18/836,255

(22) PCT Filed: Feb. 6, 2023

(86) PCT No.: PCT/JP2023/003732
§ 371 (c)(1),
(2) Date: Aug. 6, 2024

(87) PCT Pub. No.: WO2023/153350
PCT Pub. Date: Aug. 17, 2023

(65) Prior Publication Data
US 2025/0047210 A1 Feb. 6, 2025

(30) Foreign Application Priority Data

Feb. 8, 2022 (JP) ................................. 2022-017820
May 13, 2022 (JP) ................................. 2022-079370

(51) Int. Cl.
H02M 3/335 (2006.01)
H02M 1/00 (2006.01)
H02M 3/00 (2006.01)

(52) U.S. Cl.
CPC ..... *H02M 3/33592* (2013.01); *H02M 1/0067* (2021.05); *H02M 3/01* (2021.05); *H02M 3/33571* (2021.05)

(58) Field of Classification Search
CPC .. H02M 3/33592; H02M 1/0067; H02M 3/01; H02M 3/33571; H02M 1/0043; H02M 1/0064; H02M 1/0095; Y02B 70/10
See application file for complete search history.

(56) References Cited

U.S. PATENT DOCUMENTS 6,297,976 B1 * 10/2001 Isono ................ H02M 3/33553
363/71
10,256,739 B2 * 4/2019 Hao ......................... H02M 3/01
(Continued)

FOREIGN PATENT DOCUMENTS

JP 6696617 B1 5/2020
JP 2021-035200 A 3/2021
JP 2021-153382 A 9/2021

OTHER PUBLICATIONS

International Searching Authority, International Search Report and Written Opinion received for International Application No. PCT/JP2023/003732, dated Apr. 11, 2023, 11 pages, Japan Patent Office, Japan.

*Primary Examiner* — Yusef A Ahmed
(74) *Attorney, Agent, or Firm* — Buchalter LLP

(57) ABSTRACT

A plurality of half-bridge LLC converters including a resonance circuit including resonant capacitors Cr1 to Crn are included as a circuit element 10, and a resonant capacitor Crk (k is a natural number of 1 to n) of each of the circuit element 10 has one end connected in series to a resonant reactor Lr and a primary winding N of a transformer T, and another end connected to the resonant capacitor Crk of another one of the circuit elements 10 so as to construct a k-dimensional multiphase LLC converter having a phase difference of 360°/Pk by Pk (Pk is any natural number of two or more) of the circuit elements 10, secondary windings S of (Continued)

a transformer of the circuit element 10 operating in the same phase are connected in series and the secondary windings are star-connected.

4 Claims, 7 Drawing Sheets

(56) References Cited

U.S. PATENT DOCUMENTS

| | | | | |
|---|---|---|---|---|
| 10,658,937 | B1 * | 5/2020 | Zafarana | H02M 1/083 |
| 12,119,750 | B2 * | 10/2024 | Drofenik | H02M 3/01 |
| 12,149,178 | B2 * | 11/2024 | Drofenik | H02M 7/4815 |
| 12,368,384 | B2 * | 7/2025 | Hu | H02M 3/33592 |
| 2008/0190906 | A1 * | 8/2008 | Aigner | H02M 3/335 |
| | | | | 219/130.21 |
| 2008/0298093 | A1 * | 12/2008 | Jin | H02M 3/285 |
| | | | | 363/126 |
| 2010/0328968 | A1 * | 12/2010 | Adragna | H02M 3/01 |
| | | | | 363/21.02 |
| 2011/0069514 | A1 * | 3/2011 | Chiba | H02M 3/01 |
| | | | | 363/21.02 |
| 2012/0262953 | A1 * | 10/2012 | Jungreis | H02M 3/33571 |
| | | | | 363/21.02 |
| 2012/0275197 | A1 * | 11/2012 | Yan | H02M 3/33592 |
| | | | | 363/21.02 |
| 2012/0307529 | A1 * | 12/2012 | Chiba | H02M 1/08 |
| | | | | 363/17 |
| 2014/0268891 | A1 * | 9/2014 | Sigamani | H02M 1/14 |
| | | | | 363/17 |
| 2016/0072388 | A1 * | 3/2016 | Dubus | H02M 3/3376 |
| | | | | 363/25 |
| 2016/0254756 | A1 * | 9/2016 | Yang | H01F 27/2823 |
| | | | | 363/21.02 |
| 2018/0006568 | A1 * | 1/2018 | Adragna | H02M 3/01 |
| 2018/0191168 | A1 * | 7/2018 | Banaska | H02M 3/01 |
| 2018/0342958 | A1 * | 11/2018 | Ji | H02M 3/33571 |
| 2019/0109543 | A1 * | 4/2019 | Adragna | H02M 3/01 |
| 2019/0355506 | A1 * | 11/2019 | Fei | H01F 27/2804 |
| 2019/0379291 | A1 * | 12/2019 | Xue | H02M 7/219 |
| 2019/0379292 | A1 * | 12/2019 | Fei | H01F 3/14 |
| 2020/0014306 | A1 * | 1/2020 | Riar | H02M 3/33584 |
| 2020/0350826 | A1 * | 11/2020 | Adragna | H02M 3/01 |
| 2021/0083590 | A1 * | 3/2021 | Lu | H01F 38/08 |
| 2021/0408927 | A1 * | 12/2021 | Zhang | H02M 3/33592 |
| 2022/0103083 | A1 * | 3/2022 | Zhou | H02M 1/348 |
| 2023/0009358 | A1 * | 1/2023 | Li | H02M 3/33573 |
| 2023/0223856 | A1 * | 7/2023 | Sato | H02M 1/081 |
| | | | | 363/21.02 |
| 2025/0202375 | A1 * | 6/2025 | Chiba | H02M 3/01 |
| 2025/0317066 | A1 * | 10/2025 | Takagi | H02M 1/0064 |
| 2025/0373168 | A1 * | 12/2025 | Chiba | H02M 3/01 |

* cited by examiner (a)

(b)

(a) One of connection points in four-dimensional direction (b) One of connection points in five-dimensional direction (c) One of connection points in six-dimensional direction

SWITCHING POWER SUPPLY DEVICE

CROSS REFERENCE TO RELATED APPLICATIONS

This application is a National Stage Application, filed under 35 U.S.C. § 371, of International Application No. PCT/JP2023/003732, filed Feb. 6, 2023, which international application claims priority to and the benefit of Japanese Application No. 2022-017820, filed Feb. 8, 2022, and Japanese Application No. 2022-079370, filed May 13, 2022; the contents of both of which are hereby incorporated by reference in their entirety.

BACKGROUND

Technical Field

The present invention relates to a switching power supply device that converts input voltage into output voltage by using a plurality of LLC converters connected in parallel.

Description of Related Art

In recent years, in order to realize large current and a low ripple with increase in an output load, there is known a multiphase switching power supply device in which the number of operation phases (the number of phases) is more than one and phases are shifted to drive each operation phase (see, for example, JP 6696617 B2).

BRIEF SUMMARY

However, as the number of phases increases, the number of complementary gate drive signals of a complementary switch to be prepared also increases. Therefore, control associated with increase in the number of phases becomes also complicated, and a circuit related to control becomes large in scale and so on. Accordingly, power expansion by multiple phases has not been able to be easily performed.

One aspect of the present invention provides a switching power supply device capable of achieving high power without increasing the number of complementary gate drive signals.

A switching power supply device according to one aspect of the present invention includes, as circuit elements, a plurality of half-bridge LLC converters including a first switch element and a second switch element connected in series to both ends of a DC power supply, and a resonant circuit including a resonant reactor having one end connected to a connection point between the first switch element and the second switch element, a primary winding of a transformer, and n (n is a natural number of two or more) of a first order resonant capacitor to an n-th order resonant capacitor. In the switching power supply device, a k-th order resonant capacitor (k is a natural number of one to n) of each circuit element has one end connected in series to the resonant reactor and a primary winding of the transformer, and has another end connected to a k-th order resonant capacitor of another circuit element so that a k-dimensional multiphase LLC converter having a phase difference of 360°/Pk is constructed by Pk (Pk is any natural number of two or more) circuit elements, secondary windings of a transformer of a circuit element operating in the same phase are connected in series and the secondary windings are star-connected.

Further, a switching power supply device according to one aspect of the present invention includes, as circuit elements, a plurality of half-bridge LLC converters including a first switch element and a second switch element connected in series to both ends of a DC power supply, and a resonant circuit including a resonant reactor having one end connected to a connection point between the first switch element and the second switch element, a primary winding of a transformer, and (n−1) (n is a natural number of two or more) of a first order resonant capacitor to an (n−1)-th order resonant capacitor. In the switching power supply device, a k-th order resonant capacitor (k is a natural number of 1 to (n−1)) of each circuit element has one end connected in series to the resonant reactor and a primary winding of the transformer, and has another end connected to a k-th order resonant capacitor of another circuit element so that a k-dimensional multiphase LLC converter having a phase difference of 360°/Pk is constructed by Pk (Pk is any natural number of two or more) circuit elements. The (n−1)-dimensional multiphase multi-plex LLC converter in which secondary windings of a transformer of a circuit element operating in the same phase are connected in series and the secondary windings are star-connected is included.

According to one aspect of the present invention, the complementary gate drive signal can be made smaller than the total number of circuit elements, and high power can be realized without increasing the complementary gate drive signal.

DETAILED DESCRIPTION OF VARIOUS EMBODIMENTS

Figure 1:
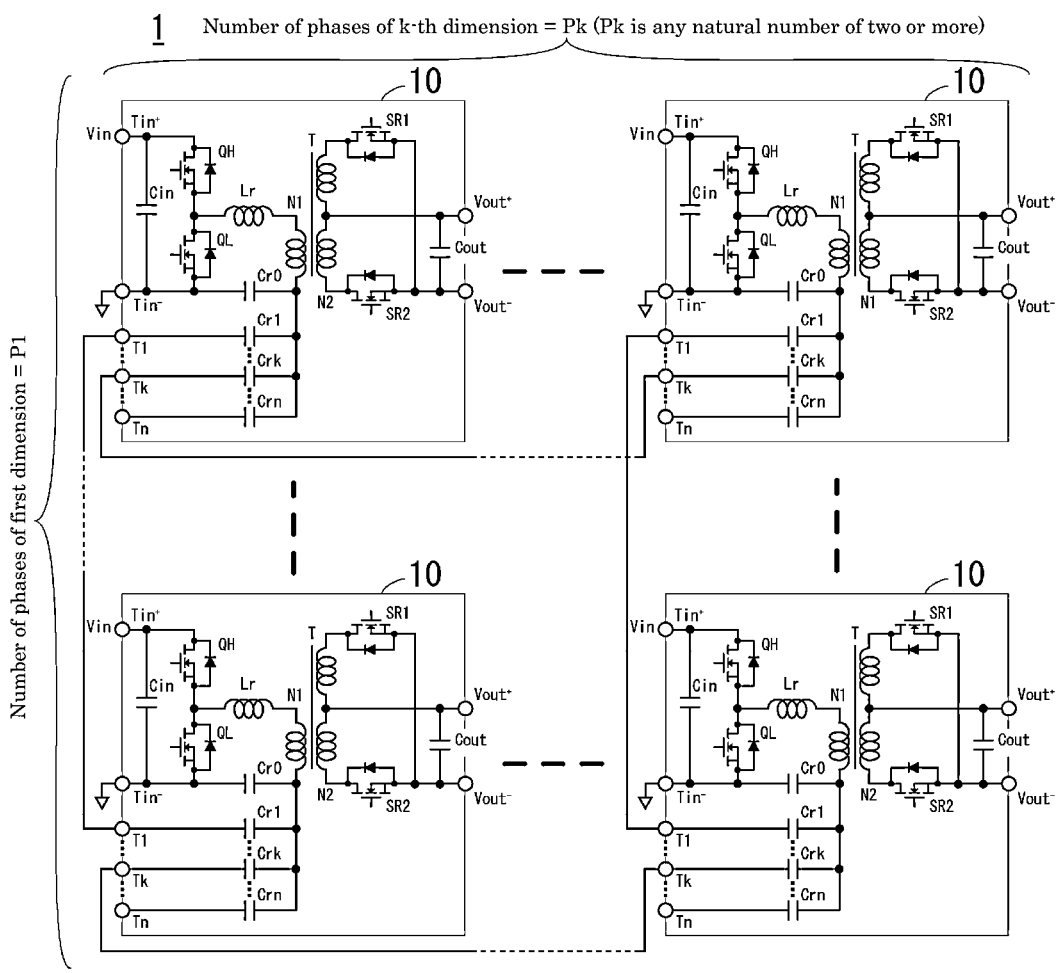
FIG. 1 is a diagram illustrating a circuit configuration of an embodiment of a switching power supply device.

Hereinafter, an embodiment of the present invention will be described in detail with reference to the drawings. In an embodiment below, the identical reference numeral is given to configurations indicating the same functions, and description of such configurations is appropriately omitted.

Referring to FIG. 1, a switching power supply device 1 according to the present embodiment includes a plurality of (Σ) half-bridge LLC converters (hereinafter, referred to as circuit elements 10). In the switching power supply device 1, each of one to n dimensions is configured as a multiphase LLC converter. That is, the switching power supply device 1 is a multiphase multi-LLC converter. Here, n is a natural number of two or more, and the switching power supply device 1 including a multiphase LLC converter of two or more dimensions will be described below.

The circuit element 10 includes a first switch element QH and a second switch element QL connected in series between a high potential input terminal $Tin^+$ connected to a positive electrode of a DC power supply Vin and a low potential input terminal $Tin^-$ connected to a negative electrode of the DC power supply Vin.

The circuit element 10 includes a resonant circuit including a resonant reactor Lr having one end connected to a connection point between the first switch element QH and the second switch element QL, a primary winding N of a transformer T, and n+1 resonant capacitors Cr0 to Crn.

The circuit element 10 includes a rectifier smoothing circuit including synchronous rectifying elements SR1 and SR2 that rectify and smooth voltage of a secondary winding S of the transformer T and an output capacitor Cout.

In FIG. 1, only a main circuit of the circuit element 10 is illustrated in a solid line frame (corresponding to a module). For the rectifier smoothing circuit, a rectifying system such as center tap rectification, bridge rectification, voltage doubler rectification, and Cockcroft-Walton rectification can be employed.

An input capacitor Cin is connected between the high potential input terminal $Tin^+$ and the low potential input terminal $Tin^-$, and both ends of the output capacitor Cout are connected to a high potential output terminal $Vout^+$ and a low potential output terminal $Vout^-$.

The resonant capacitor Cr0 has one end connected in series to the resonant reactor Lr and the primary winding N of the transformer T, and another end connected to the low potential input terminal $Tin^-$.

The resonant capacitors Cr1 to Cm have one ends which are all connected in series to the resonant reactor Lr and the primary winding N1 of the transformer T, and another ends respectively connected to bypass terminals T1 to Tn. Another end (bypass terminal Tk) of a k-th (k is a natural number of one to n) resonant capacitor Crk is connected to another end (bypass terminal Tk) of the k-th resonant capacitor Crk of another one of the circuit elements 10 so that a k-dimensional multiphase LLC converter having a phase difference of 360°/Pk is constructed by Pk (Pk is any natural number) of the circuit elements 10. In the present description, each of n interconnection points of the bypass terminals T1 to Tn is referred to as a k dimension regardless of orthogonality of dimensions.

The total number Σ of the circuit elements 10 is expressed by Formula (1) below by using Pk, which is the number of phases in each of k dimensions.

[Mathematical formula 1]

$$\sum = \prod_{k=1}^{n} Pk \qquad (1)$$

Figure 2:
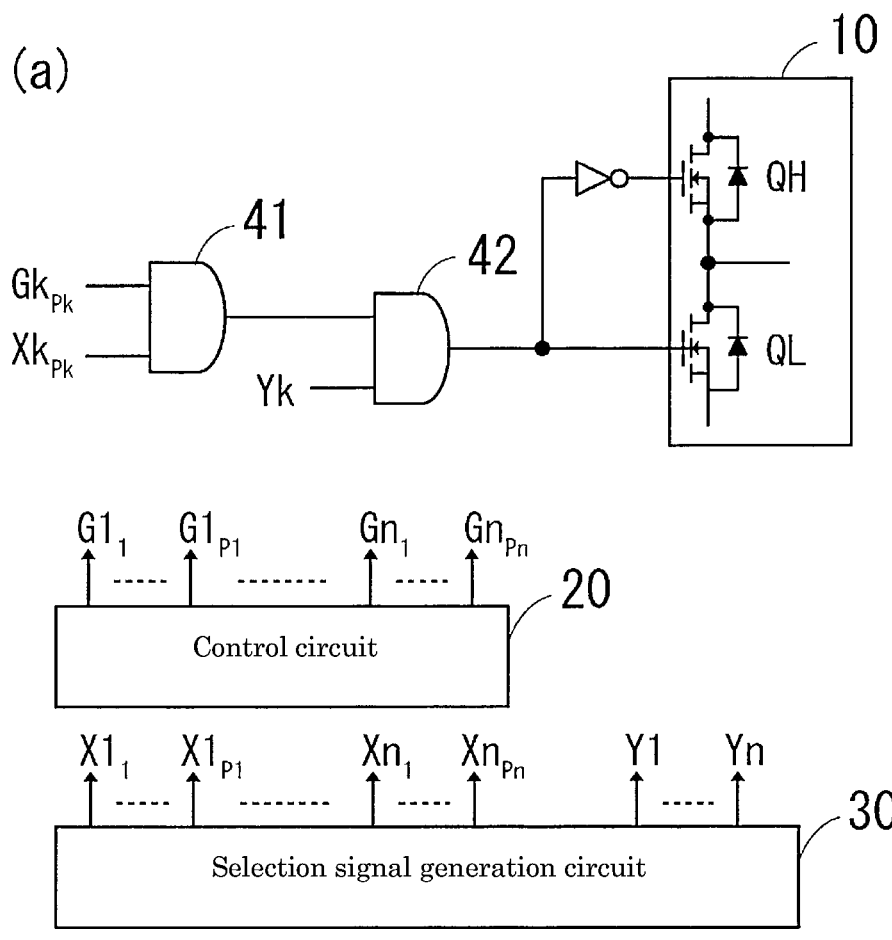
FIG. 2 is a diagram for explaining a circuit for controlling operation of the switching power supply device illustrated in FIG. 1.
Figure 2:
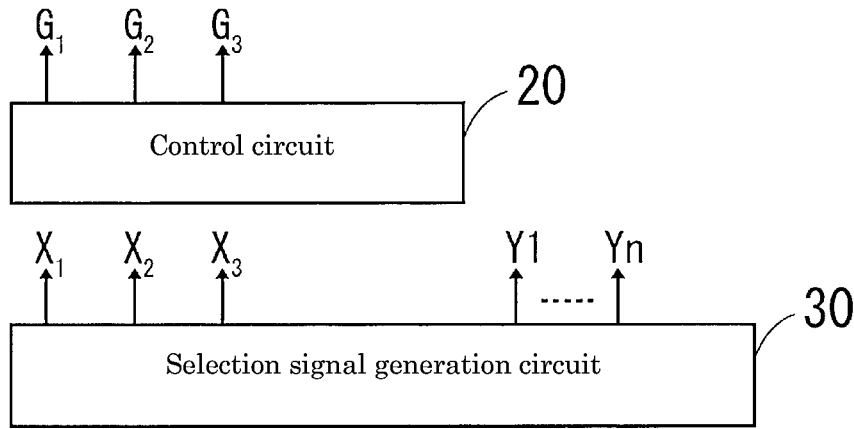

Referring to FIG. 2(a), the switching power supply device 1 includes a control circuit 20 and a selection signal generation circuit 30. The control circuit 20 alternately turns on and off the first switch element QH and the second switch element QL of the E circuit elements 10 by a complementary gate drive signal $Gk_{Pk(k=1 \ to \ n)}$. The selection signal generation circuit 30 controls a dimension selection circuit 42 by a dimension selection signal Yk to select operation and stop of the circuit element 10 for each dimension, and controls a phase selection circuit 41 by a phase selection signal $Xk_{Pk(k=1 \ to \ n)}$ to select operation and stop of the Σ circuit elements 10 for each dimension and phase.

The number of phases P1 to Pn in each of one to n dimensions may be different, but are identical so that the same complementary gate drive signal GPk can be used in each dimension. By using the same complementary gate drive signal GPk, it is possible to easily perform power expansion by multiple phases without a circuit related to control becoming large in scale. Also when the number of phases Pk is two or a divisor of another number of phases Pk, the complementary gate drive signal $G_{Pk(1 \ to \ n)}$ of another dimension can be similarly used.

For example, in a case where the numbers of phases P1 to Pn of one to n dimensions are all set to three, as illustrated in FIG. 2(b), the number of complementary gate drive signals generated by the control circuit 20 is three, $G_1$, $G_2$, and $G_3$, and the number of phase selection signals generated by the selection signal generation circuit 30 is also three, $X_1$, $X_2$, and $X_3$.

Figure 3:
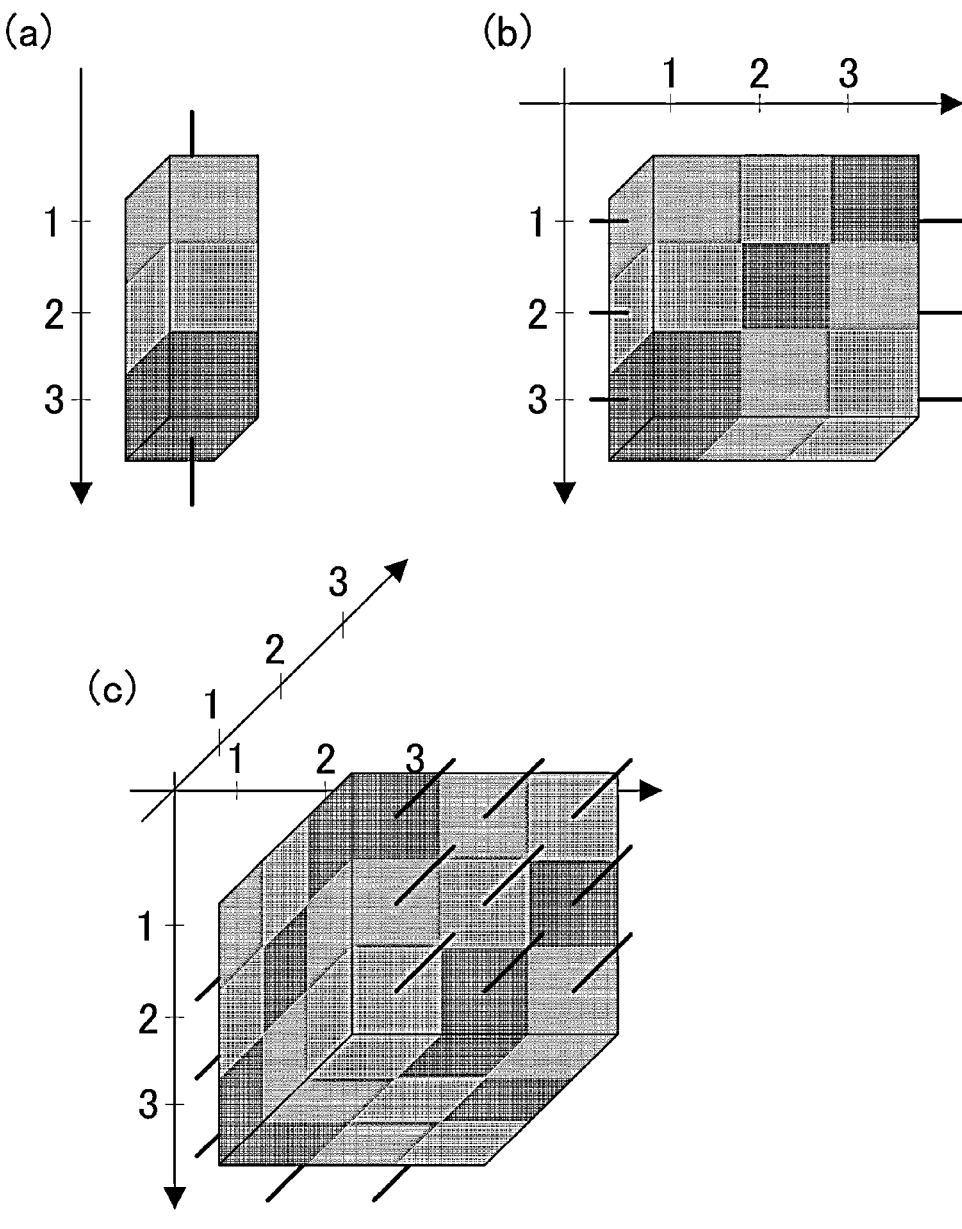
FIG. 3 is a diagram for explaining multidimensionalization (one to three dimensions) of the switching power supply device.

In a one-dimensional three-phase LLC converter including three of the circuit elements 10 including only the resonant capacitor Cr1, a phase is different by 360°/3 in each of the circuit elements 10. In FIG. 3(a), the circuit elements 10 are represented by three types of cubes having different concentrations, and a connection point that interconnects another end (the bypass terminal T1) of the resonant capacitor Cr1 is represented by one line penetrating three cubes.

For expansion in a two-dimensional direction, one of the resonant capacitor Cr1 of the circuit element 10 including two of the resonant capacitors Cr1 and Cr2 is connected in a one-dimensional direction, and another one of the resonant capacitor Cr2 is connected in a two-dimensional direction in a manner that phases do not overlap at a connection point. By the above, as illustrated in FIG. 3(b), three connection points are added in a two-dimensional direction, and nine of the circuit elements 10 including six interconnection points construct a two-dimensional three-plex LLC converter. FIG. 3(b) illustrates only a connection point in a two-dimensional direction.

Furthermore, for expansion in a three-dimensional direction, two of the resonant capacitors Cr1 and Cr2 of the circuit element 10 having three of the resonant capacitors Cr1, Cr2, and Cr3 are connected in a one-dimensional direction and a two-dimensional direction, respectively, and the third resonant capacitor Cr3 is interconnected in a three-dimensional direction in a manner that phases do not overlap at a connection point. By the above, as illustrated in FIG. 3(c), nine interconnection points are added in a three-dimensional direction, and twenty-seven circuit elements 10 including twenty-seven interconnection points construct a three-dimensional three-phase nine-plex LLC converter. FIG. 3(c) illustrates only a connection points in a three-dimensional direction.

As described above, the switching power supply device 1 is a multiphase LLC converter at a certain connection point, and when compared between connection points, multiphase LLC converters overlap to form a multi-plex LLC converter. Therefore, the switching power supply device of the present embodiment can be referred to as a multiphase multi-plex LLC converter.

Figure 4:
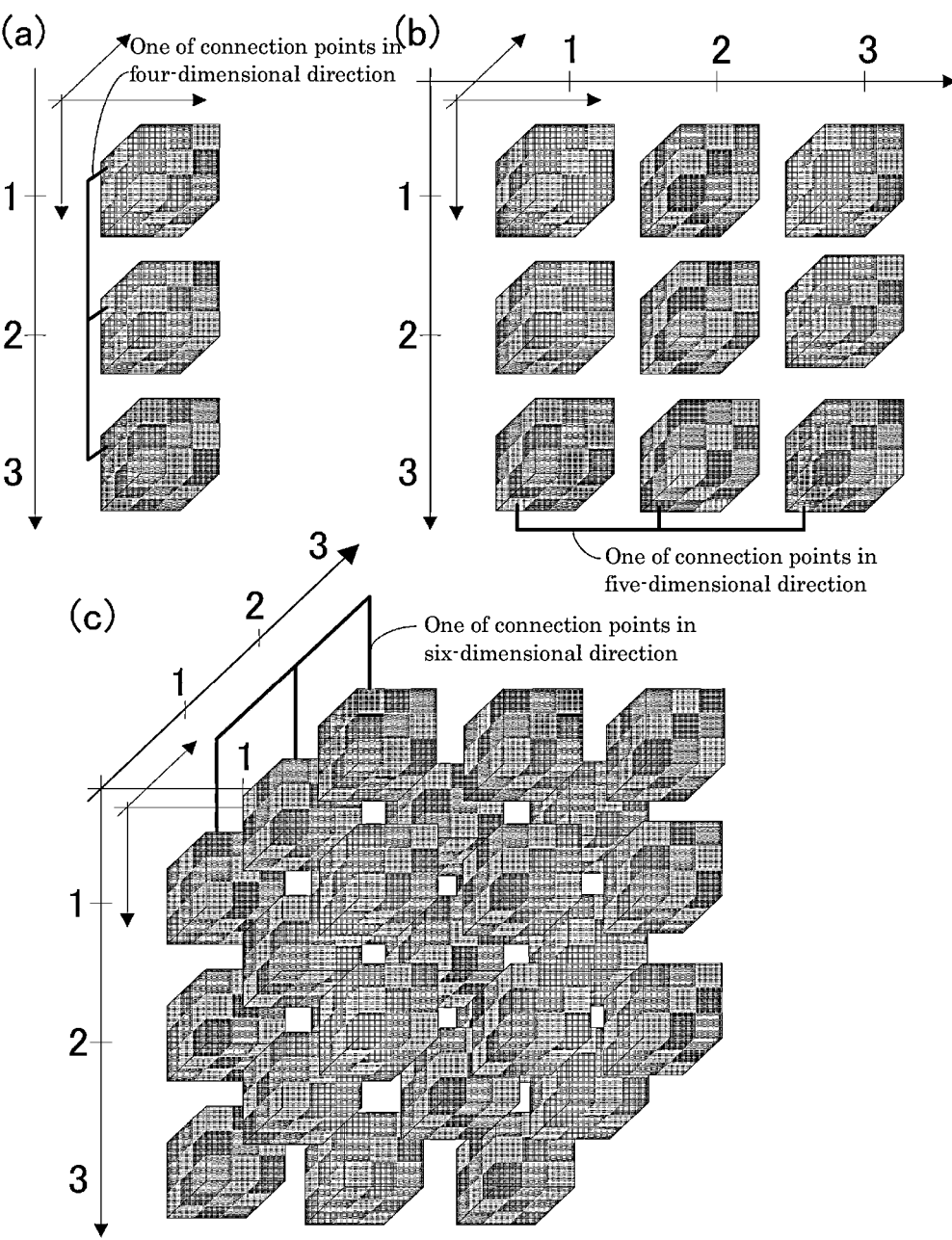
FIG. 4 is a diagram for explaining multidimensionalization (four to six dimensions) of the switching power supply device.

Furthermore, if the three-dimensional three-phase nine-plex LLC converter illustrated in FIG. 3(b) is expressed as one cube, as illustrated in FIG. 4(a), four dimensions can be recognized similarly as one dimension. For expansion in a four-dimensional direction, three of the resonant capacitors Cr1, Cr2, and Cr3 of the circuit element 10 including four of the resonant capacitors Cr1, Cr2, Cr3, and Cr4 are connected in three dimensions as described above, and the fourth resonant capacitor Cr4 is connected in a four-dimensional direction. By the above, a four-dimensional three-phase twenty-seven-plex LLC converter is constructed by eighty-one in total of the circuit elements 10 including three cubes by which a three-dimensional three-phase nine-plex LLC converter is constructed. As for connection points of four-dimensional three-phase twenty-seven-plex LLC converter, a cube of a three-dimensional three-phase nine-plex LLC converter already contains twenty-seven connection points, and since there are three cubes, there are eighty-one connection points, and twenty-seven connection points are added in a four-dimensional direction, so that one-hundred-eight connection points in total are included. FIG. 4(*a*) illustrates one of connection points in a four-dimensional direction.

When extended in a five-dimensional direction, as illustrated in FIG. 4(*b*), two-hundred-forty-three of the circuit elements 10 including four-hundred-five interconnection points construct a five-dimensional three-phase eighty-one-plex LLC converter. FIG. 4(*b*) illustrates one of connection points in a five-dimensional direction.

When expanded in a six-dimensional direction, as illustrated in FIG. 4(*c*), seven-hundred-twenty-nine of the circuit elements 10 including one-thousand-four-hundred fifty-eight interconnection points construct a six-dimensional three-phase two-hundred-forty-three-plex LLC converter. FIG. 4(*c*) illustrates one of connection points in a six-dimensional direction.

Figure 5:
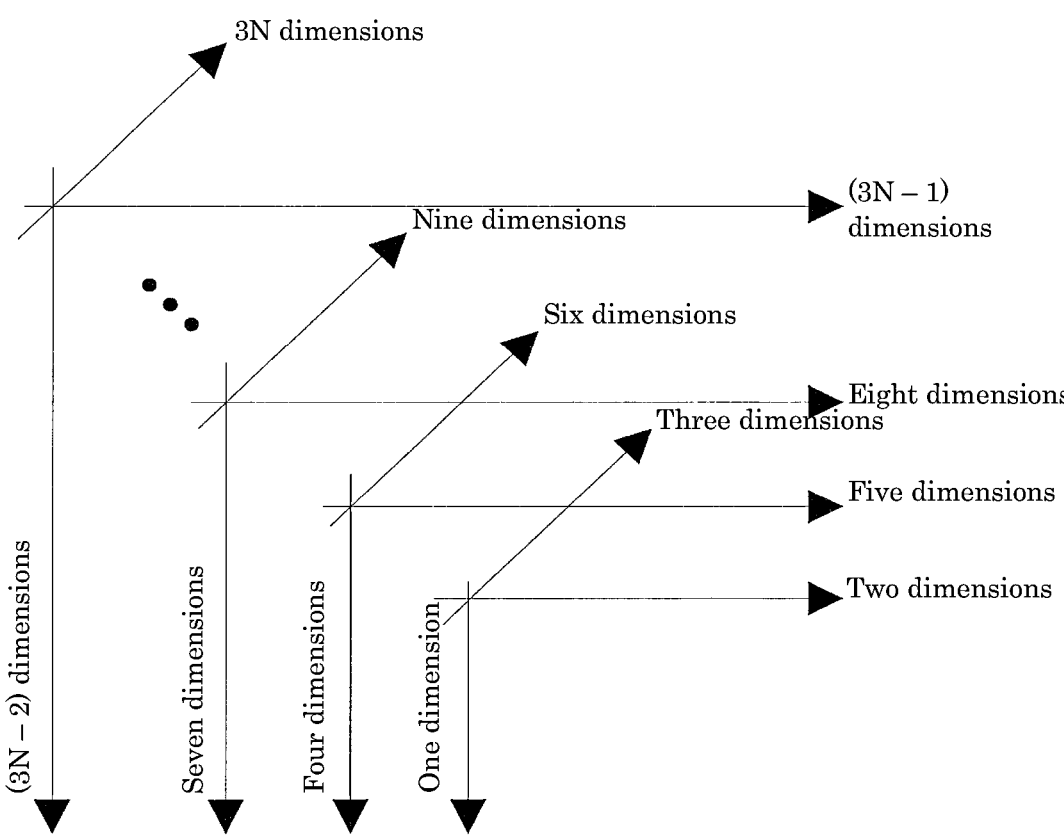
FIG. 5 is a diagram for explaining multidimensionalization of the switching power supply device.

Similarly, a six-dimensional three-phase two-hundred-forty-three-plex LLC converter extended to six dimensions is expressed by one cube, and as illustrated in FIG. 5, the number of circuits can be increased to seven dimensions, eight dimensions, and nine dimensions. Further increase in dimensionality is realized by adding a dimension axis to a multidimensional multi-plex LLC converter configured with 3N (N is a natural number) dimensions as one cube. Therefore, when a three-phase LLC converter is made n-dimensional, an n-dimensional three-phase $3^{n-1}$-plex LLC converter is obtained. In this way, it is possible to realize high power without increasing the number of complementary gate drive signals from three phases.

As described above, the switching power supply device 1 has a multidimensional fractal structure obtained by overlapping three-dimensional orthogonal axes. In a case of expansion to three or more dimensions, it is not necessary to set a phase difference to 360°/Σ unlike a conventional multiphase system according to the total number Σ of the circuit elements 10. Since it is not necessary to prepare a complementary gate drive signal generation circuit that generates Σ phase differences, a circuit related to control is prevented to become large in scale. In particular, in a case where the numbers of phases Pk in the dimension are identical, by construction of a multiphase LLC converter having a phase difference of 360°/Pk with respect to a certain connection point, it is possible to increase the number of circuits and increase power while performing current balance by using a circuit that generates Pk complementary gate drive signals.

The switching power supply device 1 according to the present embodiment can be constructed as an integrated circuit (for example, as a power supply IC or a system-on-chip (SoC)) in which a semiconductor and a magnetic component are mixed in a package having limited size. As a simplified example, the switching power supply device 1 having output power of 1 kW (kilowatt) can be realized by connecting ten of the circuit elements 10 that output power of 100 W. A multi-phase multi-plex converter configured by an integrated circuit may be applied to a Micro Electro Mechanical System (MEMS).

The circuit element 10 of the switching power supply device 1 includes the resonant capacitors Cr1 to Crn divided into n pieces in addition to the resonant capacitor Cr0 having another end connected to the low potential input terminal Tin⁻. Another end (bypass terminal Tk) of the k-th (1 to n) resonant capacitor Crk is connected to another end (bypass terminal Tk) of the k-th resonant capacitor Crk of another one of the circuit elements 10 so that a multiphase LLC converter having a phase difference of 360°/Pk is constructed by Pk of the circuit elements 10. In this case, the total number Σ of the circuit elements 10 included in the switching power supply device 1 is expressed by Formula (1) above, and a total number Σc of interconnection points by the resonant capacitors Cr1 to Crn is expressed by Formula (2) below.

[Mathematical formula 2]

$$\sum c = \prod_{k=1}^{n} Pk \cdot \prod_{k=1}^{n} Pk^{-1} \tag{2}$$

A resonance frequency or when all Σ of the circuit elements 10 of the switching power supply device 1 operate is expressed by Formula (3) below.

[Mathematical formula 3]

$$\omega r = \frac{1}{\sqrt{Lr \sum_{k=0}^{n} Cr_k}} \tag{3}$$

The resonance frequency or in a case where capacities of the resonant capacitors Cr0 to Crn are equal is expressed by Formula (4) below.

[Mathematical formula 4]

$$\omega r = \frac{1}{\sqrt{Lr \sum_{k=0}^{n} Cr_k}} = \frac{1}{\sqrt{Lr \frac{Cr_k}{n+1} \cdot (n+1)}} = \frac{1}{\sqrt{LrCr}} \tag{4}$$

That the total number Σ of the circuit elements 10 and interconnection points coincide with each other is a condition expressed by Formula (5) below from Formulas (1) and (2).

[Mathematical formula 5]

$$\sum_{k=0}^{n} Pk^{-1} \leq 1 \tag{5}$$

In particular, when the circuit element 10 is modularized as illustrated in FIG. 1, the total number Σ of the circuit elements 10 and connection points can be limited to 1:1.

Figure 6:
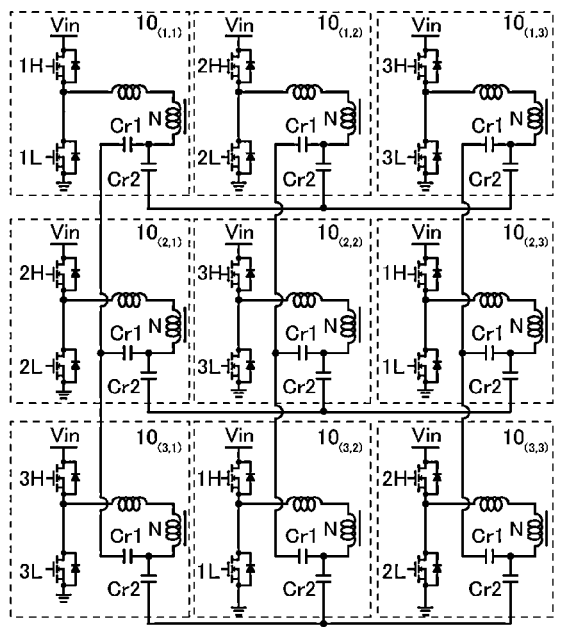
FIG. 6 is a diagram illustrating another configuration example of the embodiment of the switching power supply device.
Figure 6:
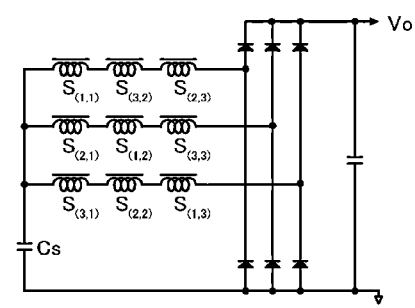

The switching power supply device 1 according to the present embodiment also has property of a multi-plex converter in which phases overlap each other. Therefore, for example, in the two-dimensional three-phase three-plex LLC converter illustrated in FIG. 3(*b*), as illustrated in FIG. 6, secondary windings S operating in the same phase on the secondary side can be connected in series, and these can be star-connected. In FIG. 6, a suffix (x, y) indicates a phase in which x is a one-dimensional direction and a phase in which y is a two-dimensional direction. FIG. 6 illustrates a two-dimensional three-phase three-plex LLC converter with the resonant capacitor Cr0 (see FIG. 1) omitted. A capacitor Cs on the secondary side is connected to a secondary-side power supply line as a capacitor that guarantees potential stability of a star connection portion when operation and stop of the circuit element 10 are switched.

In FIG. 6, the secondary winding S(1, 1) operating in a first phase in one dimension and the secondary windings S(3, 2), S(2, 3) are connected in series, the secondary winding S(2, 1) operating in a second phase in one dimension and the secondary windings S(1, 2) and S(3, 3) are connected in series, the secondary winding S(3, 1) operating in a third phase in one dimension and the secondary windings S(2, 2) and S(1, 3) are connected in series and the secondary windings are star-connected. Three cubes having the same concentration in nine cubes illustrated in FIG. 3(*b*) are connected in series.

In the two-dimensional three-phase three-plex LLC converter illustrated in FIG. 6, output voltage Vo can be changed by switching operation of a plurality of the circuit elements 10 to which another end (opposite side to one end connected to the primary winding N) of the resonant capacitor Crk is connected. For example, when the selection signal generation circuit 30 stops operation of circuit elements 10(1, 1), 10(1, 2), and 10(1, 3) connected to a connection point (another end of the resonant capacitor Cr2) in a two-dimensional direction of a first row in FIG. 6, the output voltage Vo becomes ⅔ of output voltage obtained at the time of operation of all circuit elements. Furthermore, when the selection signal generation circuit 30 also stops operation of circuit elements 10(2, 1), 10(2, 2), and 10(2, 3) connected to a connection point (another end of the resonant capacitor Cr2) in a two-dimensional direction of a second row in FIG. 6, the output voltage Vo becomes ⅓ of output voltage obtained at the time of operation of all circuit elements.

In the secondary windings S connected in series, the same current flows, and the same current also flows in the primary winding N according to the ampere-turn law. The two-dimensional three-phase three-plex LLC converter illustrated in FIG. 6 is current-balanced by connection of the resonant capacitor Cr1 in a one-dimensional direction and current-balanced by series connection of the secondary winding S in a two-dimensional direction.

Figure 7:
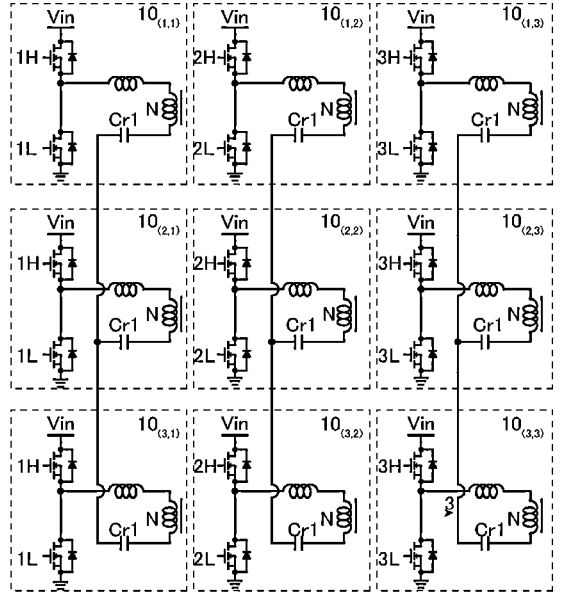
FIG. 7 is a diagram illustrating a variation of a two-dimensional three-phase three-plex LLC converter illustrated in FIG. 6.
Figure 7:
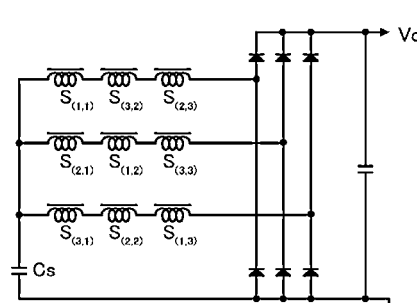

Therefore, connection of the resonant capacitor Cr2 in a two-dimensional direction can be omitted. FIG. 7 is obtained by omitting the resonant capacitor Cr2 from the two-dimensional three-phase three-plex LLC converter illustrated in FIG. 6. On the primary side, three three-phase LLC converters connected in a one-dimensional direction are arranged in parallel. In a case where capacity of the resonant capacitors Cr1 and Cr2 illustrated in FIG. 6 is α/2, capacity of the resonant capacitor Cr1 illustrated in FIG. 7 is set to a.

Figure 8:
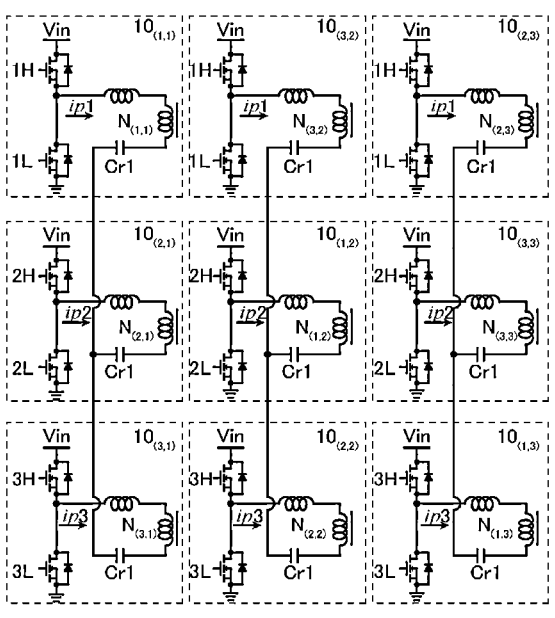
FIG. 8 is a diagram for explaining operation of the variation illustrated in FIG. 7.
Figure 8:
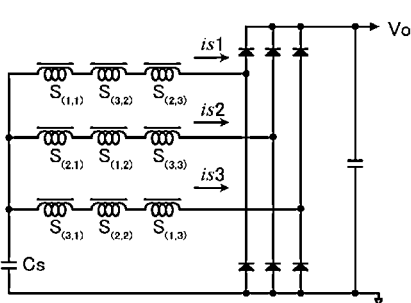

An example of operation of a three-phase LLC converter illustrated in FIG. 7 will be described with reference to FIG. 8. The secondary windings S(1, 1), S(3, 2), and S(2, 3) are connected in series, and are operated by a complementary gate drive signal 1H/1L of a first phase in phase. Since the secondary windings S(1, 1), S(3, 2), and S(2, 3) are in a series circuit, same current is1 flows. Therefore, same current ip1 also flows through the primary windings N(1, 1), N(3, 2), and N(2, 3) according to the ampere-turn law. Similarly, is2 and is3 flow through a series circuit of the secondary windings S(2, 1), S(1, 2), and S(3, 3) and a series circuit of the secondary windings S(3, 1), S(2, 2), and S(1, 3), respectively, and ip2 and ip3 also flow to the primary side, respectively. Then, balance is performed as a three-phase LLC converter in a one-dimensional direction of FIG. 8, ip1=ip2=ip3 holds, and the secondary output current is also balanced as is1=is2=is3.

As described above, the same current flows through the secondary windings S(1, 1), S(3, 2), and S(2, 3), the secondary windings S(2, 1), S(1, 2), and S(3, 3), or the secondary windings S(3, 1), S(2, 2), and S(1, 3) by forcing nature of series connection. Then, the same current flows through the in-phase primary windings N in a row direction by the ampere-turn law. Then, since a column direction, that is, a one-dimensional direction is balanced at a connection point (star connection) in the column direction of the resonant capacitor Cr1, the same current flows through all the circuit elements 10.

As described above, in an n-dimensional multiphase multi-plex converter, by connecting the secondary windings S of the transformer T in series, the number of resonant capacitors Crk of each of the circuit element 10 can be reduced by one dimension, that is, by one. The effect of reducing the resonant capacitor Crk increases as the switching power supply device expands in multiple dimensions.

That is, a multiphase multi-plex LLC converter of (n−1) dimensions becomes an n-dimensional multiphase multi-plex LLC converter by connecting the secondary windings S having overlapping phases in series and performing star connection. Then, the output voltage Vo can be optionally changed by operation and stop of each circuit element of a half-bridge LLC converter connected to a certain connection point.

As described above, according to the present embodiment, a plurality of (Σ) half-bridge LLC converters including the first switch element QH and the second switch element QL connected in series to both ends of the DC power supply Vin, and a resonant circuit including the resonant reactor Lr having one end connected to a connection point between the first switch element QH and the second switch element QL, the primary winding N of the transformer T, and n (n is a natural number of two or more) of a first order resonant capacitor to an n-th order resonant capacitor (resonant capacitors Cr1 to Crn) are included as the circuit elements 10. The resonant capacitor Crk (k is a natural number of one to n) of each of the circuit elements 10 has one end connected in series to the resonant reactor Lr and the primary winding N of the transformer T, and another end connected to another end of the resonant capacitor Crk of another one of the circuit elements 10 so that a k-dimensional multiphase LLC converter having a phase difference of 360°/Pk is constructed by Pk (Pk is any natural number of two or more) of the circuit elements 10. The secondary windings S of the transformer T of the circuit element 10 operating in the same phase are connected in series and the secondary windings are star-connected.

With this configuration, the number of complementary gate drive signals can be made smaller than the total number of circuit elements, and high power can be realized without increasing complementary gate drive signals.

Further, according to the present embodiment, a plurality of (Σ) half-bridge LLC converters including the first switch element QH and the second switch element QL connected in series to both ends of the DC power supply Vin, and a resonant circuit including the resonant reactor Lr having one end connected to a connection point between the first switch element QH and the second switch element QL, the primary winding N of the transformer T, and (n−1) (n is a natural number of two or more) of a first order resonant capacitor to an (n−1)-th order resonant capacitor (resonant capacitors Cr1 to Cr(n−1)) are included as the circuit elements 10. The resonant capacitor Crk (k is a natural number of 1 to (n−1)) of each circuit element includes an (n−1)-dimensional multiphase LLC converter in which one end is connected in series to the resonant reactor Lr and the primary winding N of the transformer T, another end is connected to the resonant capacitor Crk of another one of the circuit elements 10 so as to constitute a k-dimensional multiphase LLC converter having a phase difference of 360°/Pk by Pk (Pk is any natural number of two or more) of the circuit elements 10, secondary windings of the transformer T of the circuit element 10 operating in the same phase are connected in series and the secondary windings are star-connected.

With this configuration, the number of complementary gate drive signals can be made smaller than the total number of circuit elements, and high power can be realized without increasing complementary gate drive signals, and it is possible to reduce the number of the resonant capacitors Crk of the circuit element 10 by one dimension, that is, by one. The effect of reducing the resonant capacitor Crk increases as the switching power supply device expands in multiple dimensions.

Furthermore, according to the present embodiment, the dimension selection circuit 42 that selects operation and stop of the circuit element 10 in units of dimension, and the selection signal generation circuit 30 that generates a dimension selection signal that controls the dimension selection circuit 10 are included.

With this configuration, the output voltage Vo can be changed in units of dimension, that is, by switching operation of the circuit element 10 connected to another end of the same resonant capacitor Crk.

Although the present invention is described above with reference to the specific embodiment, it is needless to say that the above-described embodiment is an example and can be modified and implemented without departing from the spirit of the present invention.

In the above embodiment, the resonant reactor Lr is physically provided in each of the circuit elements 10. Alternatively, the resonant reactor Lr may use leakage inductance of a transformer.

The invention claimed is:

1. A switching power supply device comprising:
a plurality of half-bridge LLC converters each configured as a circuit element, each of the plurality of half-bridge LLC converters including:
a first switch element and a second switch element connected in series to both ends of a DC power supply; and
a resonant circuit including a resonant reactor having one end connected to a connection point between the first switch element and the second switch element, a primary winding of a transformer, and n resonant capacitors comprising a first order resonant capacitor to an $n^{th}$ order resonant capacitor, wherein n is a natural number equal to or greater than two,
wherein a $k^{th}$ order resonant capacitor of the n resonant capacitors of each circuit element has one end connected in series to the resonant reactor and the primary winding of the transformer, and another end connected to a $k^{th}$ order resonant capacitor of one or more other circuit elements so that a k dimensional multiphase LLC converter having a phase difference of 360°/Pk is constructed by Pk circuit elements, wherein k is a natural number between one and n, and Pk is any natural number equal to or greater than two, and
wherein secondary windings of the transformer of the circuit element operating in a same phase are connected in series, and the secondary windings are star-connected.

2. The switching power supply device according to claim 1, further comprising:
a dimension selection circuit that selects operation and stop of the circuit element in units of dimension; and
a selection signal generation circuit that generates a dimension selection signal for controlling the dimension selection circuit.

3. A switching power supply device comprising:
a plurality of half-bridge LLC converters each configured as a circuit element, each of the plurality of half-bridge LLC converters including:
a first switch element and a second switch element connected in series to both ends of a DC power supply; and
a resonant circuit including a resonant reactor having one end connected to a connection point between the first switch element and the second switch element, a primary winding of a transformer, and n−1 resonant capacitors comprising a first order resonant capacitor to an $n−1^{th}$ order resonant capacitor, wherein n is a natural number equal to two or greater,
wherein a $k^{th}$ order resonant capacitor of the n−1 resonant capacitors of each circuit element has one end connected in series to the resonant reactor and the primary winding of the transformer, and another end connected to a $k^{th}$ order resonant capacitor of one or more other circuit elements so that a k dimensional multiphase LLC converter having a phase difference of 360°/Pk is constructed by Pk circuit elements, wherein k is a natural number between one and n−1, and Pk is any natural number equal to or greater than two, the switching power supply device further comprising
n−1 dimensional multiphase multi-plex LLC converter, in which secondary windings of the transformer of the circuit element operating in a same phase are connected in series and the secondary windings are star-connected.

4. The switching power supply device according to claim 3, further comprising:
a dimension selection circuit that selects operation and stop of the circuit element in units of dimension; and
a selection signal generation circuit that generates a dimension selection signal for controlling the dimension selection circuit.

* * * * *